March 24, 1970
C. L. KESZLER ET AL
3,502,018
APPARATUS FOR MANUFACTURING SAUSAGE
Filed March 17, 1967
2 Sheets-Sheet 1
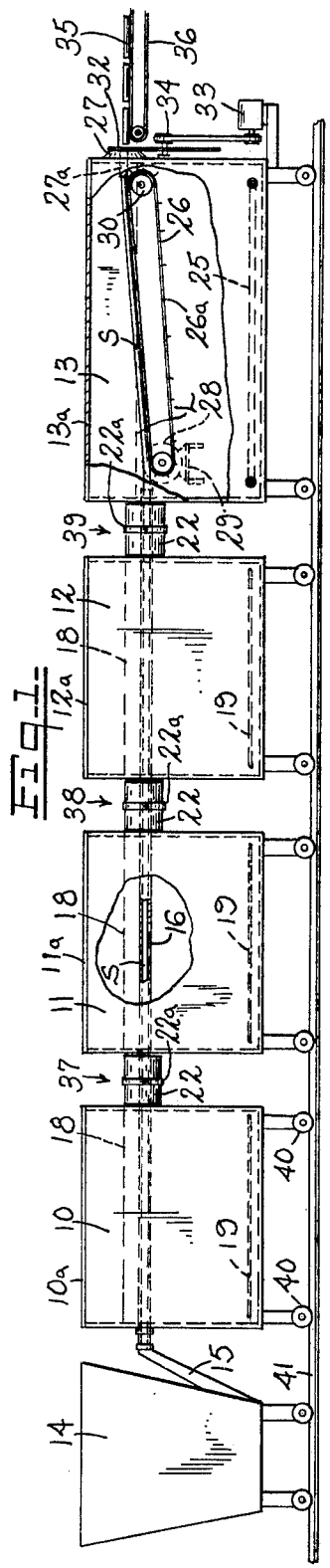
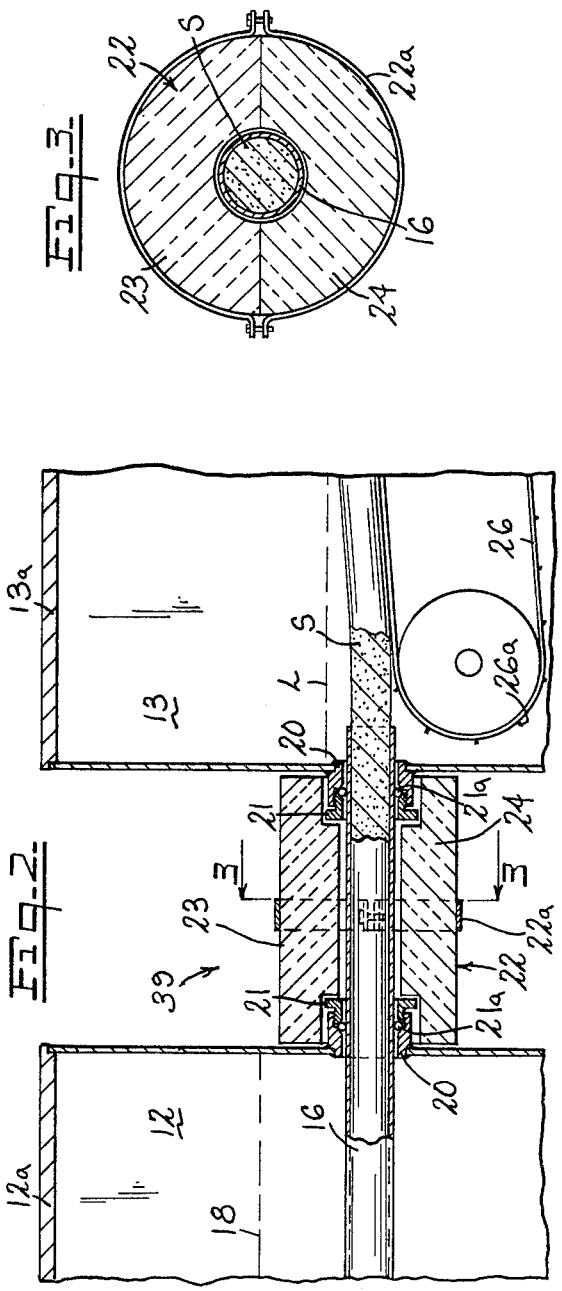
INVENTORS
Charles L. Keszler
William R. Stanwood
BY De Lio and Montgomery
ATTORNEYS March 24, 1970  C. L. KESZLER ETAL  3,502,018
APPARATUS FOR MANUFACTURING SAUSAGE
Filed March 17, 1967  2 Sheets-Sheet 2
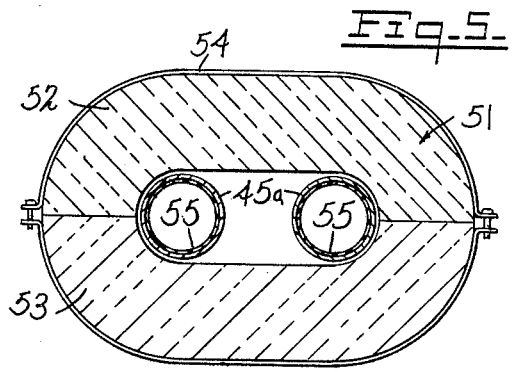
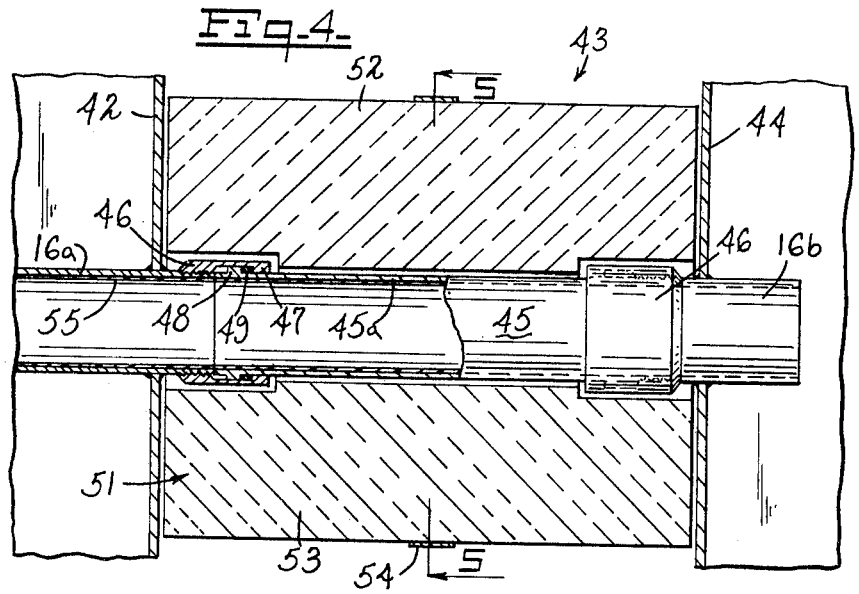
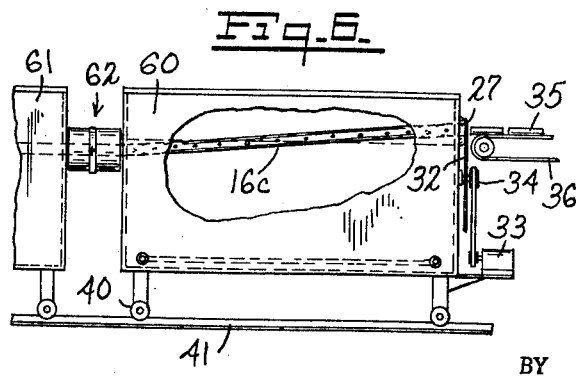
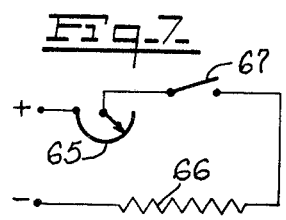
INVENTORS
Charles L. Keszler
William R. Stanwood
BY
De Lio and Montgomery
ATTORNEYS United States Patent Office 3,502,018
Patented Mar. 24, 1970

3,502,018
APPARATUS FOR MANUFACTURING SAUSAGE
Charles L. Keszler, Salt Island Road, Westbrook, Conn. 06498, and William R. Stanwood, 132 N. Cove Road, Old Saybrook, Conn. 06475
Filed Mar. 17, 1967, Ser. No. 623,876
Int. Cl. A22c 11/00; B02c 18/00
U.S. Cl. 99—355                    8 Claims

ABSTRACT OF THE DISCLOSURE

Apparatus for continuously producing cooked and formed meat products from raw emulsions by continuously forcing or extruding comminuted meat through one or more parallel cooking tubes which pass through a plurality of heating devices which may be held at the same or different temperatures. Heat is uniformly applied externally of the tubes in each heating device. Between the heating devices, the tube is insulated to prevent heat loss from the meat and minimize the temperature gradient across the cross-sectional area of the meat in the tube.

---

This invention relates to apparatus for producing finished sausages and more particularly relates to techniques for continuously producing finished sausage which does not require further cooking or smoking.

It has been the common practice to produce sausage by stuffing fluid-like emulsion of meat products, often referred to as pape, into an elongated casing, typing the casing at specified intervals and then heat-processing the emulsion within the casing so as to cure and cook the meat. So-called skinless sausages, more commonly known as skinless franks, have the casing stripped from the product after casing thereof. Different techniques have been proposed for cooking sausage meat as it exits from a stuffer. It has been proposed to surround a meat forming horn with a coil energized by a high-frequency generator to establish a high-frequency current within the confines of the coil which subjects the meat to a high-frequency heating current to partially cook the meat and produce an initial set in the product. However, this type of heating has not been found to produce even distribution of heat through the meat. In some cases, the sausage meat is placed in fixed molds and is electrically heated to produce an initial set in the meat. However, these molds are intermittent in operation in that they must be continually loaded and unloaded. Further, it has been proposed to cook the sausage meat as it is extruded through a tube by application of electrical power at spaced apart intervals along the length of the tube. In effect, electrical resistance heating is employed and the comminuted meat or emulsion is itself the conductor and resistance. This technique is not known to have found any practical application. The distribution of many types of meat products in the sausage material would not give equal resistance across the cross sectional area of the material and uneven heating is likely to occur. Moreover, in all of these techniques employing electrical power, only an initial set in the meat is achieved and additional conventional cooking is required.

To our knowledge, by far the predominant method of processing and cooking sausage is still done by extruding the comminuted meat into an elongated casing, tying the casing at intervals to define links and then cooking the meat thus far prepared in a so-called smokehouse. It is not believed that the use of molds or high-frequency electrical heating or resistance heating of a sausage emulsion to produce a finished meat product has found any practical usage.

The present invention is intended to provide a new and improved apparatus for continuously cooking a comminuted meat or a raw emulsion as it is extruded or forced through a length of forming tube and controlling the temperature applied to the tubing along various intervals thereof while applying uniform heat to a given section of the tubing.

Accordingly, an object of this invention is to provide a new and improved apparatus for cooking sausage meat.

Another object of this invention is to provide a new and improved apparatus for continuously cooking continuous lengths of sausage meat as it moves through a length of heat conductive tubing.

Another object of this invention is to provide a new and improved apparatus for continuously cooking a continuous length of sausage meat in which the sausage meat is exposed to uniform heat in predetermined sections of the tubing which are separated by equalizing areas in which the temperature gradient across the cross section of the meat is minimized.

The features of the invention which are believed to be novel are set forth with particularity and distinctly claimed in the concluding portion of this specification. The invention, however, both as to its organization and operation, together with further objects and advantages thereof, may best be appreciated by reference to the following detailed description taken in conjunction with the drawings in which:

FIG. 1 is a side elevation of apparatus embodying the invention;

FIG. 2 is an enlarged view of a portion of the apparatus of FIG. 1;

FIG. 3 is a view seen in the plane of lines 3—3 of FIG. 2;

FIG. 4 is an enlarged view partly in section of an alternate construction to that shown in FIGS. 1 and 2;

FIG. 5 is a cross-sectional view seen in the plane of lines 5—5 of FIG. 4;

FIG. 6 is a view in side elevation and partially cut away showing an alternate construction to that shown in FIG. 1; and FIG. 7 is a schematic diagram of an electrical heating circuit which may be utilized in conjunction with the invention.

Apparatus embodying the invention as exemplified in FIG. 1 comprises a plurality of heating tanks 10, 11 and 12, a cooling tank 13, and a pressurized stuffer 14. Stuffer 14 is illustrated diagrammatically and may be of any suitable construction well known to those skilled in the art. Briefly, a stuffer accepts comminuted meat or the meat emulsion, pressure is applied thereto and the emulsion at approximately 50° F. is forced out through a main conduit 15. Main conduit 15 connects to a continuous cooking tube 16 extending through heating tanks 10, 11 and 12 to a cooling tank 13, which also may serve as a coloring tank. As shown in FIG. 2, tube 16 terminates a short distance within tank 13.

Tubing 16 in the embodiment of the invention shown in FIGS. 1–3 is continuous in length through the various heating tanks. In operation, it is completely submerged in a heating liquid 18, such as water or oil, in tanks 10, 11 and 12, which are heated, for example, as by means of electric heaters 19 disposed within the tanks. Each of the tanks 10, 11 and 12 have at opposite ends thereof annular flanges 20 affixed thereto as by welding which have an internal thread adapted to receive an external thread on a sealing fitting 21 extending therein. Disposed within flange 20 about tube 16, is an O-ring seal 21a which is compressed by fitting 21 to prevent leakage of the liquid in the tanks through the flanges 20. Disposed about tube 16 between tanks are insulating sleeves 22 comprised of two halves 23 and 24 which are fitted about tube 16 and the halves 23 and 24 thereof are held together as by means of a compression ring 22a. The sleeves 22 may be of any suitable material such as asbestos. The purpose of the insulation between the tanks is to prevent loss of heat as the sausage S moves from one tank to the next and, further, to provide an equalizing area so that the heat imparted to the sausage through tube 16 in one tank will equalize across the cross-sectional area of the sausage and minimize or eliminate any temperature gradients therein. The insulation prevents the loss of heat from the sausage in the tube through the tube to the ambient atmosphere. Accordingly, the heat in the sausage is trapped therein and any temperature gradients across the section of the sausage between the tanks will tend to minimize or eliminate itself. Tank 13 contains a cooling and, optionally, a coloring liquid L which is maintained at a predetermined temperature by refrigeration or cooling coils 25. Tube 16 terminates within cooling tank 13 and the cooked sausage exits from tube 16 onto a conveyor belt 26 which carries the cooked sausage through the cooling and coloring liquid L to a discharge aperture 27 defined by a short length section of tubing 27a. Conveyor belt 26 is an endless belt which is driven by a motor 28 mounted externally of tank 13 on a platform 29 and moves about an idler pulley 30 within tank 13. As the cooked meat S exits from tube 16 it is subjected to the cooling liquid which may have coloring therein and then moves along conveyor belt 26. Belt 26 is preferably provided with guides 26a which may have U-shaped indentations (not shown) therein which retain the finished product in fixed lateral position on conveyor belt 26. The speed of the belt is synchronized to the discharge speed of sausage S from tube 16. As the cooked and cooled sausage exits from tank 13 it may be severed by a rotating blade 32 driven by a motor 33 through a pulley 34, and the severed lengths of the sausage 35 fall onto a conveyor 36 where they are delivered to a packaging or collection facility.

Considering now the operation of the apparatus shown in FIGS. 1–3, tube 16 is of continuous length and uniform cross-sectional shape and diameter and as the sausage meat is first passed through tube 16 in tank 10 it is heated to a first temperature which, for example, may be 125 to 140 degrees Fahrenheit. In this temperature range the proteins in the comminuted meat will start to coagulate and impart an initial set to the pape. Prior to initial passage of the meat through first tank 10, the water or heating liquid therein is brought to a predetermined temperature for a period of time and the tube 16 is allowed to equalize to this temperature. Tube 16 in tank 10 is then effective to transmit heat to the meat or otherwise stated heats the meat uniformly throughout the surfaces in contact therewith. Thereafter, as the meat passes through and absorbs heat from tube 16 in tank 10, the only additional heat that need be supplied to the water is to provide for the losses due to radiation or convection from the tank and the heat supplied to the sausage meat in tube 16. As the preheated meat enters equalizing area 37, between tanks 10 and 11, application of heat to the sausage is temporarily discontinued and the heat therein will tend to travel and equalize throughout the cross section to eliminate any temperature gradients and heat the meat product uniformly throughout. The heat in the sausage is trapped therein by virtue of the insulating sleeve and essentially the only heat flow is within the sausage. After leaving equalizing area 37 the sausage meat enters heating tank 11 where it is subjected to heat at a somewhat higher temperature to further cook the sausage meat. Upon exiting from tank 11, the sausage meat passes through equalizing area 38 which again allows the heat in the sausage meat to equalize throughout and then enters a final cooking tank 12 where it is subjected to a final cooking treatment before entering a last equalizing area 39 between tanks 12 and 13. As the sausage product S exits from tube 16 in tank 13 it is fully cooked and is then subjected to cooling liquid which may have a coloring agent placed therein to impart color to the cooked product. The cooked sausage S then moves on conveyor 26 to tube 27a and, hence, to be severed by blade 32 and transported by conveyor 36.

The tanks 10, 11, 12 and 13 are preferably closed but have access doors 10a, 11a, 12a and 13a in the top thereof. If desired the tanks may be mounted on wheels as exemplified by wheels 40 of tank 10 movable on rails 41 (only one shown) as may be stuffer 14.

It is to be understood that the number of heating tanks may vary dependent upon the particular sausage product to be manufactured. In this respect, the flanges 20 affixed to the heating tanks may be of a size which will accommodate several sizes of a tube 16 dependent upon the sausage product to be manufactured. In such case, the dimensions of the opening through the fitting 21 may be varied for a particular size tube as would the O-ring seal 21a.

FIG. 4 illustrates another embodiment of the invention where a tube 16a through each of the tanks does not extend continuously through all of the tanks. The tubing 16a is exemplified as being sealed to a heating tank 42 connected to an equalizing area 43 and, hence, a cooling tank 44. A connector 45 is provided to connect tube 16a in tank 42 to cooling tank 44 and tubing section 16b. Connector 45 comprises a section of tubing 45a of same internal diameter as tubes 16a and 16b. Tubes 16a and 16b are threaded on the external surface thereof as they protrude from their respective tanks 42 and 44. Connector 45 has sleeves 46 at either end thereof with internal threads which mate with the external threads on the protruding ends of tubes 16a and 16b. Sleeves 46 have an internal flange 47 which together with flanges 48 on connector tube 45a surround an annular seal 49. When sleeves 46 are screwed onto tubes 16a and 16b, the seals 49 are compressed and a liquid tight connection is provided between the tubes and the connector to thus provide a continuous tube through all the tanks.

As thus far described, only one extruding or cooking tube 16 has been shown passing through the heating and cooling tanks. However, it is to be understood that there may be a plurality of parallel tubes, as exemplified in FIG. 5, which shows parallel connectors 45a enclosed within insulating sleeve 51. Sleeve portions 52 and 53 are compressively held about connectors 45a by compression band 54.

It is also to be understood that the cooking or extruding tubes 16a, 16b, etc. may be lined with a coating of material having a low coefficient of friction such as polytetrafluoroethylene, more commonly known by its trademark "Teflon." Such coating is exemplified at 55 in tubes 16a and 16b and connector 45a and may also be applied to the continuous tube 16 of the apparatus shown in FIGS. 1–3. The use of such a lining may depend on the material of the tubing selected for the tubing. For example, if the tubing 16 is stainless steel, it may be unnecessary to put the internal lining therein.

FIG. 6 illustrates another embodiment of the invention wherein the tube through which the meat product passes in a cooling tank 60 is received from a heating tank 61 and equalizer area 62 and passes through a tubing 16c which is perforated, formed of a spiral wire-like material, or otherwise open to allow the cooling fluid to have direct contact with the meat product as it passes through tube 16c to discharge orifice 27. In this instance, the tube 16c acts only as a guide and the cooling tank 60 with tube 16c therein may replace cooling tank 13 and conveyor 26.

FIG. 7 illustrates schematically a heating circuitry comprising a potentiometer 65, heating resistance 66 and switch 67 which may be utilized to set the temperature in the heating or cooking tanks.

In operation, with any of the arrangements illustrated, the pape or sausage meat passes through zones where it is subjected to uniform heat through the walls of the cooking tube, with heat equalizing areas provided after the cooking zones. The pape may be completely cooked as it is discharged from the last heating tank into the cooling tank.

In the case of frankfurters having a diameter or major transverse dimension of about three-fourths of an inch, the heating tanks may be approximately eight to ten feet long, and the pape forced through at a rate of one inch per second. In the first cooking zone or tank the cooking tube would be maintained at a temperature of approximately 125°–140° F. to impart partial cooking without losing the liquids in the pape and start the pape to coagulate or take a set. In the second cooking zone or tank, the temperature may be increased to 150°–170° F. to impart further cooking to the product. Then in the third heating zone or tank, the temperature is raised to 190°–200° F. and the cooking is completed. The proteins in the meat pape will coagulate to form an external skin at about 170° F. The equalizing areas may be twelve to eighteen inches long. There will be some temperature gradient along the length of the equalizing areas due to the difference in temperature of the adjoining tanks. However, there is essentially no heat loss to the ambient atmosphere.

It is to be understood that the term sausage as used herein includes all compressed type meat products such as frankfurters. knockwurst, bologna, salami, etc. capable of being simultaneously formed and cooked as herein described.

From the foregoing it will be apparent that the objects and advantages set forth above as well as those made apparent from the preceding description are efficiently attained. While a preferred embodiment of the invention has been shown for purposes of disclosure, other embodiments of the invention, as well as modifications to the disclosed embodiment which do not depart from the scope of the invention may occur to others skilled in the art.

What is claimed is:

1. Apparatus for continuously cooking meat products comprising a length of heat conductive tubing defining a passageway therethrough for passage of a meat material, means for forcing the material through the passageway, plural spaced means disposed along the length of said tubing for uniformly heating predetermined lengths of said tube to predetermined temperatures, and means for preventing loss of heat from said tubing in the space between said heating means.

2. The apparatus of claim 1 wherein said means disposed along the length of said tubing comprises spaced tanks having a heatable fluid therein surrounding said tubing and means for heating said liquid.

3. The apparatus of claim 2 wherein each tank contains a section of tubing and insulated connector means join the tubes of adjacent tanks.

4. The apparatus of claim 3 wherein said sections of tubing and said connectors have an internal coating of a material having a low coefficient of friction.

5. The apparatus of claim 2 further including an additional tank having a cooling medium therein, said additional tank having means communicating with said tubing for conveying the material through said additional tank while exposing the material to said cooling medium.

6. The apparatus of claim 5 wherein said conveying means comprises an endless belt conveyor.

7. The apparatus of claim 5 wherein said conveying means comprises a perforate tubing.

8. The apparatus of claim 1 wherein said tubing has an internal coating of a material having a low coefficient of friction.

References Cited

UNITED STATES PATENTS

| | | | |
|---|---|---|---|
| 2,208,651 | 7/1940 | Wallace | 99—355 XR |
| 2,623,451 | 12/1952 | Prohaska | 99—352 |
| 2,933,758 | 4/1960 | Moule | 17—32 |
| 2,953,461 | 9/1960 | Prohaska | 99—352 XR |
| 3,235,388 | 2/1966 | Francis | 99—109 |
| 3,421,434 | 1/1969 | Krachmer | 99—352 |

FOREIGN PATENTS

| | | |
|---|---|---|
| 957,179 | 1/1957 | Germany. |
| 891,175 | 3/1962 | Great Britain. |

BILLY J. WILHITE, Primary Examiner

U.S. Cl. X.R.

99—109, 441